(12) United States Patent
Kilian et al.

(10) Patent No.: US 8,801,844 B2
(45) Date of Patent: Aug. 12, 2014

(54) AUTOCATALYTIC PLATING BATH COMPOSITION FOR DEPOSITION OF TIN AND TIN ALLOYS

(75) Inventors: Arnd Kilian, Berlin (DE); Jens Wegricht, Berlin (DE); Isabel-Roda Hirsekorn, Paulinenaue (DE)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 13/996,551

(22) PCT Filed: Jan. 11, 2012

(86) PCT No.: PCT/EP2012/050349
§ 371 (c)(1),
(2), (4) Date: Jun. 21, 2013

(87) PCT Pub. No.: WO2012/100982
PCT Pub. Date: Aug. 2, 2012

(65) Prior Publication Data
US 2013/0309404 A1    Nov. 21, 2013

(30) Foreign Application Priority Data
Jan. 28, 2011    (EP) .................................... 11152524

(51) Int. Cl.
*C23C 18/52* (2006.01)
*C09D 1/00* (2006.01)
*C23C 18/31* (2006.01)

(52) U.S. Cl.
CPC . *C09D 1/00* (2013.01); *C23C 18/52* (2013.01); *C23C 18/31* (2013.01)
USPC ...................................... 106/1.22; 106/1.25

(58) Field of Classification Search
CPC ...................................................... C23C 18/31
USPC ................................................ 106/1.22, 1.25
See application file for complete search history.

(56) References Cited

U.S. PATENT DOCUMENTS

| | | | | |
|---|---|---|---|---|
| 4,194,913 A * | 3/1980 | Davis | | 106/1.22 |
| 5,143,544 A * | 9/1992 | Iantosca | | 106/1.22 |
| 5,169,692 A * | 12/1992 | Couble et al. | | 106/1.22 |
| 5,173,109 A * | 12/1992 | Iantosca | | 106/1.22 |
| 5,360,471 A | 11/1994 | Takano et al. | | |
| 5,364,459 A * | 11/1994 | Senda et al. | | 106/1.22 |
| 6,860,981 B2 * | 3/2005 | Schetty et al. | | 106/1.25 |
| 2005/0145502 A1 * | 7/2005 | Schetty et al. | | 205/253 |
| 2006/0113006 A1 * | 6/2006 | Masuda et al. | | 148/270 |
| 2007/0007144 A1 * | 1/2007 | Schetty, III | | 205/300 |
| 2010/0021695 A1 * | 1/2010 | Naoyuki et al. | | 428/173 |
| 2012/0132530 A1 * | 5/2012 | Hayashi et al. | | 205/125 |
| 2013/0252099 A1 * | 9/2013 | Misumi et al. | | 429/213 |

FOREIGN PATENT DOCUMENTS

| | | |
|---|---|---|
| JP | 2010196167 | 9/2010 |
| WO | WO 2008/081637 A1 * | 7/2008 |
| WO | WO 2009/157334 A1 * | 12/2009 |

OTHER PUBLICATIONS

PCT/EP2012/050349; PCT International Search Report and Written Opinion of the International Searching Authority dated Apr. 12, 2012.

* cited by examiner

*Primary Examiner* — Helene Klemanski
(74) *Attorney, Agent, or Firm* — Renner, Otto, Boisselle & Sklar, LLP

(57) ABSTRACT

An autocatalytic tin plating bath containing $Sn^{2+}$ ions, $Ti^{3+}$ ions as reducing agent, an organic complexing agent and phenanthroline or a derivative thereof as stabilizing agent is disclosed. The plating bath is suitable for manufacture of printed circuit boards, IC substrates and metallization of semiconductor wafers.

13 Claims, No Drawings

AUTOCATALYTIC PLATING BATH COMPOSITION FOR DEPOSITION OF TIN AND TIN ALLOYS

The present application is a U.S. National Stage Application based on and claiming benefit and priority under 35 U.S.C. §371 of International Application No. PCT/EP2012/050349, filed 11 Jan. 2012, which in turn claims benefit of and priority to European Application No. EP 11152524.2, filed 28 Jan. 2011, the entirety of each of which is hereby incorporated herein by reference.

FIELD OF THE INVENTION

The invention relates to an autocatalytic plating bath composition for deposition of tin and tin alloys and a process for applying said autocatalytic plating bath composition. The invention is directed to the manufacture of electronic parts such as printed circuit boards, IC substrates and semiconductor wafers.

BACKGROUND OF THE INVENTION

Layers of tin and tin alloys on electronic parts such as printed circuit boards, IC substrates and semiconductor wafers are used as solderable and bondable finishes in later manufacturing steps of such electronic parts.

The tin and tin alloy layers are usually deposited on metallic contact areas such as contact pads and bump structures. The contact areas are usually made of copper or copper alloys. In case such contact pads can be electrically contacted for deposition of tin and tin alloy layers such layers are deposited by conventional electroplating methods. However, in many cases the individual contact areas can not be electrically contacted. In such cases an electroless plating method needs to be applied. The method of choice in the industry for electroless plating of tin and tin alloy layers is immersion plating. The main disadvantage of immersion type plating is the limited thickness of the tin or tin alloy deposit. Immersion plating is based on an exchange between tin ions and the metallic copper contact area to be plated. With immersion type plating of tin or tin alloy layers the deposition rate decreases strongly with increasing tin layer thickness, since the exchange of Cu against Sn is hindered by the growing Sn layer. Therefore depositing tin layers exceeding a thickness of 1.0 µm with an immersion process may take too much time for many practical applications.

In situations where a thicker layer of tin or a tin alloy layer is required an autocatalytic type electroless plating process needs to be used. Plating bath compositions for autocatalytic plating of tin or tin alloys comprise a reducing agent.

The patent document U.S. Pat. No. 5,364,459 discloses electroless plating bath compositions for autocatalytic deposition of tin, the bath compositions comprising $Ti^{3+}$ ions as reducing agent, a complexing agent such as a salt of citric acid or EDTA, $Sn^{2+}$ and $Pb^{2+}$ ions and carbonate ions as pH adjusting agent.

The patent document U.S. Pat. No. 5,360,471 discloses electroless plating bath compositions for solder deposition, the bath compositions comprising $Ti^{3+}$ ions as reducing agent, complexing agents such as a salt of citric acid and EDTA, $Sn^{2+}$ ions and ammonia as pH adjusting agent.

An autocatalytic tin plating bath consisting of $TiCl_3$ as reducing agent, a salt of citric acid and EDTA as complexing agents, sodium acetate, $Sn^{2+}$ ions, benzo sulfonic acid and ammonia as pH adjusting agent is disclosed in "Autocatalytische Zinnabscheidung" ("Autocatyltic Tin Deposition"), M. E. Warwick, B. F. Müller, Metall, Vol. 36, 1982, pp. 955 to 958.

An autocatalytic plating bath for deposition of tin comprising a water-soluble tin compound, a water-soluble titanium compound, an organic complexing agent, and an organosulfur compound selected from the group consisting of mercaptanes and sulfides is disclosed in WO 2009/157334 A1.

An autocatalytic tin plating bath comprising a water-soluble tin compound, a water-soluble titanium compound and an organic complexing agent containing trivalent phosphorous is disclosed in WO 2008/081637 A1.

The autocatalytic tin plating bath compositions known in the art suffer from a balance between prevention of undesired plate-out of tin and a sufficient deposition speed required for practical applications.

OBJECT OF THE INVENTION

Therefore it is an object of the present invention to provide an autocatalytic plating bath composition for deposition of tin and tin alloys which is stable to undesired plate-out of tin or precipitation of bath constituents and at the same time provides a deposition speed which allows to use such an autocatalytic plating bath composition in a process in the manufacture of electronic parts such as printed circuit boards, IC substrates and metallization of semiconductor wafers.

SUMMARY OF THE INVENTION

This objects are solved by an aqueous autocatalytic plating bath composition for deposition of tin and tin alloys comprising a source of $Sn^{2+}$ ions
a source of $Ti^{3+}$ ions
optionally a source of inorganic pentavalent phosphorous
a stabilizing additive selected from compounds according to formula (1), formula (2) and mixtures thereof

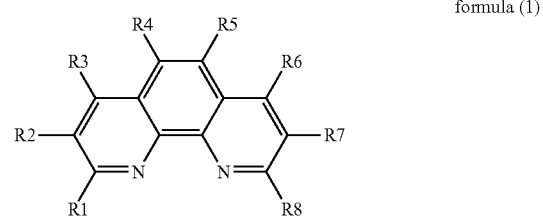

formula (1)

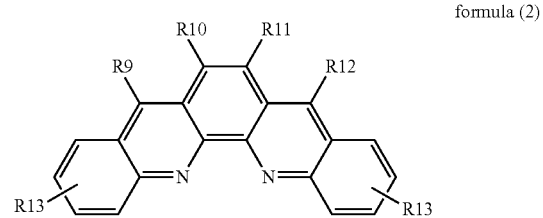

formula (2)

wherein R1, R2, R3, R4, R5, R6, R7 and R8 according to formula (1) and R9, R10, R11 and R12 according to formula (2) are independently selected from the group consisting of hydrogen, halogen, nitro, methyl, ethyl, 1-propyl, 2-propyl, phenyl, hydroxyl, sulfonate, phenyl sulfonate, amino, amido, carboxylate, and R13 is selected from hydrogen and sulfonate, at least one organic complexing agent and optionally a source for an additional metal ion selected from silver, bismuth and nickel.

DETAILED DESCRIPTION OF THE INVENTION

The present invention relates to an electroless tin plating bath composition and a process applying such electroless tin plating bath compositions.

The aqueous autocatalytic plating bath composition for deposition of tin and tin alloys comprises
a source of $Sn^{2+}$ ions
a source of $Ti^{3+}$ ions
optionally a source of inorganic pentavalent phosphorous
a stabilizing additive selected from compounds according to formula (1), formula (2) and mixtures thereof.

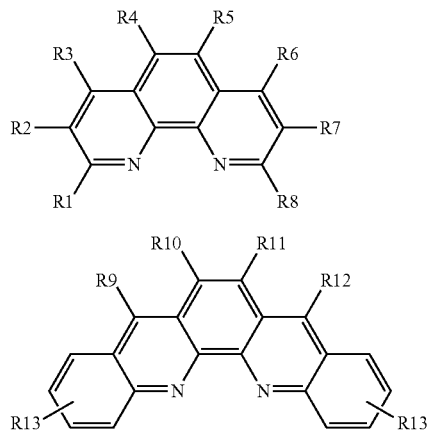

formula (1)

formula (2)

wherein R1, R2, R3, R4, R5, R6, R7 and R8 according to formula (1) and R9, R10, R11 and R12 according to formula (2) are independently selected from the group consisting of hydrogen, halogen, nitro, methyl, ethyl, 1-propyl, 2-propyl, phenyl, hydroxyl, sulfonate, phenyl sulfonate, amino, amido, carboxylate, and R13 is selected from hydrogen and sulfonate,
at least one organic complexing agent and
optionally a source for an additional metal ion selected from silver, bismuth and nickel.

The source of $Sn^{2+}$ ions is selected from water-soluble $Sn^{2+}$ compounds. The preferred water-soluble $Sn^{2+}$ compounds are selected from the group comprising $SnCl_2$, $SnSO_4$, tin methane sulfonate, tin acetate, tin citrate, tin oxalate and tin pyrophosphate. The concentration of $Sn^{2+}$ ions in the autocatalytic plating bath ranges from 2 g/l to 30 g/l, more preferably from 4 g/l to 15 g/l.

The reducing agent in the autocatalytic plating bath are $Ti^{3+}$ ions which are preferably added as water-soluble $Ti^{3+}$ compounds. The preferred $Ti^{3+}$ compounds are selected from the group comprising $TiCl_3$, $Ti_2(SO_4)_3$, $TiI_3$, and titanium(III) methane sulfonate. The concentration of $Ti^{3+}$ ions in the autocatalytic plating bath ranges from 0.5 g/l to 20.0 g/l, more preferably from 1.8 g/l to 5.0 g/l. Alternatively, a bath according to the present invention can be made up with a source of $Ti^{4+}$ ions or a mixture of $Ti^{3+}$ and $Ti^{4+}$ ions. Such a bath can be activated before use by electrochemically reducing the $Ti^{4+}$ ions to $Ti^{3+}$ ions as described in U.S. Pat. No. 6,338,787.

The source of optional inorganic pentavalent phosphorous ions present in the autocatalytic plating bath is selected from acids and salts of phosphate, hydrogenphosphate, dihydrogenphosphate, pyrophosphate or higher inorganic polyphosphates such as $[P_3O_7]^{5-}$. In case the inorganic pentavalent phosphorous compound is added as a salt the counter ions are selected from the group comprising lithium, sodium, potassium, ammonium and tin. The concentration of inorganic pentavalent phosphorous ions in the autocatalytic plating bath ranges from 20 g/l to 500 g/l, more preferably from 50 g/l to 200 g/l.

The at least one stabilizing additive is selected from compounds according to formula (1), formula (2) and mixtures thereof

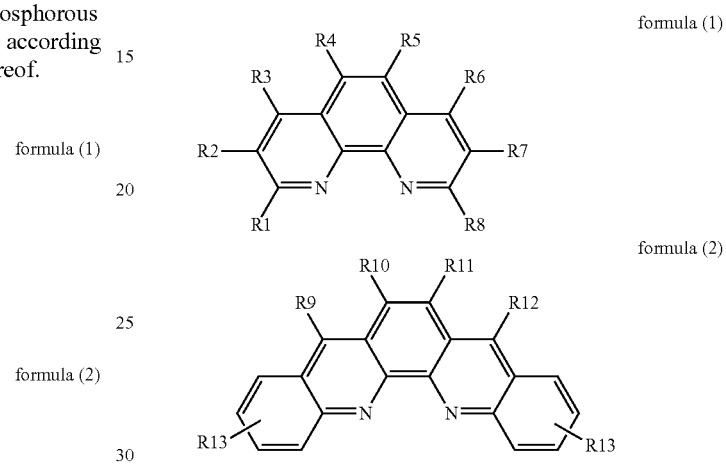

formula (1)

formula (2)

wherein R1, R2, R3, R4, R5, R6, R7 and R8 according to formula (1) and R9, R10, R11 and R12 according to formula (2) are independently selected from the group consisting of hydrogen, halogen, nitro, methyl, ethyl, 1-propyl, 2-propyl, phenyl, hydroxyl, sulfonate, phenyl sulfonate, amino, amido, carboxylate, and R13 is selected from hydrogen and sulfonate.

More preferred stabilizing additives are selected form compounds according to formula (1) wherein R1, R2, R3, R4, R5, R6, R7 and R8 are independently selected from the group consisting of hydrogen, halogen, nitro, methyl, ethyl, 1-propyl, 2-propyl, phenyl, hydroxyl, sulfonate, phenyl sulfonate, amino, amido and carboxylate.

Even more preferred stabilizing additives are selected from compounds according to formula (1) wherein the pairs of residues R1 and R8; R2 and R7; R3 and R6; R4 and R5 of the compound according to formula (1) are independently selected from the same moiety of the group consisting of hydrogen, methyl, ethyl, 1-propyl, 2-propyl, hydroxyl, sulfonate, phenyl sulfonate, amino, amido and carboxylate.

The most preferred stabilizing additives are selected from compounds according to formula (1) wherein pairs of residues R1 and R8; R2 and R7; R3 and R6; R4 and R5 are independently selected from the group consisting of hydrogen, methyl, sulfonate and phenyl sulfonate.

Adducts of the stabilizing additive according to formula (1) and formula (2) with acids such as HCl, $H_2SO_4$ and methane sulfonic acid may be used in the autocatalytic plating bath composition according to the present invention.

In case one or more residues of the stabilizing additive according to formula (1) and formula (2) are selected from sulfonate, phenyl sulfonate and carboxylate, said residues contain an additional hydrogen radical or can be used as a salt. Suitable counter ions for such salts are selected from the group consisting of lithium, sodium, potassium and ammonium.

The concentration of the stabilizing additive according to formula (1), formula (2) and mixtures thereof ranges from 0.1 mg/l to 200 mg/l, more preferably 0.5 mg/l to 100 mg/l and most preferably from 1 mg/l to 50 mg/l.

The at least one organic complexing agent is selected from aminocarboxylic acids, hydroxycarboxylic acids and polycarboxylic acids. Aminocarboxylic acids are carboxylic acids having at least one carboxyl and at least one amine moiety. The amine moiety can be a primary, secondary or tertiary amine moiety. Hydroxyl carboxylic acids are carboxylic acids having at least one carboxyl and at least one hydroxyl moiety per molecule. Polycarboxylic acids are carboxylic acids having more than one carboxyl moiety per molecule.

Preferred aminocarboxylic acids as organic complexing agent are selected from the group comprising glycine, ethylenediamine tetraacetic acid (EDTA), diethylenetriamine pentaacetic acid (DTPA), triethylenetetramine hexaacetic acid (TTHA) and salts thereof.

Preferred hydroxy carboxylic acids as organic complexing agent are selected from aliphatic hydroxy carboxylic acids having an alkyl group of $C_1$ to $C_6$. The most preferred hydroxy carboxylic acids as complexing agent are selected from the group consisting of glycolic acid, lactic acid, citric acid, tartaric acid, malic acid and salts thereof.

Preferred polycarboxylic acids as organic complexing agent are selected from the group comprising oxalic acid, malonic acid, succinic acid and salts thereof.

The concentration of the at least one organic complexing agent or salt thereof in the autocatalytic plating bath ranges from 2 g/l to 60 g/l, more preferably from 5 g/l to 20 g/l.

Optional metal ions are added to the autocatalytic plating bath in case a tin alloy is deposited. Typical tin alloys as solderable or bondable deposit on contact areas are tin-silver alloys, tin-bismuth alloys and tin-nickel alloys. A source of optional $Ag^+$, $Bi^{3+}$ and $Ni^{2+}$ ions is selected from water-soluble $Ag^+$, $Bi^{3+}$ and $Ni^{+2}$ compounds. The preferred water-soluble $Ag^+$ compound is selected from the group comprising silver nitrate, silver sulphate, silver oxide, silver acetate, silver citrate, silver lactate, silver phosphate, silver pyrophosphate and silver methane sulfonate. The preferred water-soluble $Bi^{3+}$ compound is selected from the group comprising bismuth nitrate, bismuth oxide, bismuth methane sulfonate, bismuth acetate, bismuth carbonate, bismuth chloride and bismuth citrate. The preferred source of water-soluble $Ni^{2+}$ compound is selected from the group comprising nickel chloride, nickel sulphate, nickel acetate, nickel citrate, nickel phosphate, nickel pyrophosphate and nickel methane sulfonate. The concentration of optional $Ag^+$, $Bi^{3+}$ and $Ni^{2+}$ ions in the autocatalytic plating bath ranges from 0.01 g/l to 10 g/l, more preferably from 0.02 g/l to 5 g/l.

In still another embodiment of the present invention the aqueous autocatalytic plating bath composition further comprises an N-containing compound serving as a pH adjusting agent, selected from compounds according to formula (3):

$H_2N(CH_2CH_2NH)_nH$  formula (3)

wherein n ranges from 0 to 4.

Such an N-containing compound serving as a pH adjusting agent is particularly preferred when the organic complexing agent is an aminocarboxylic acid.

The concentration of the optional N-containing compound according to formula (3). ranges from 1 g/l to 100 g/l, more preferably from 5 g/l to 50 g/l.

In still another embodiment of the present invention the aqueous autocatalytic plating bath composition further comprises an inorganic sulphur-containing compound selected from the group comprising sulfides, disulfides, polysulfides, thiosulfates and mixtures thereof. Suitable inorganic sulphide, disulfide and polysulfide compounds are selected from their respective salts with lithium, sodium, potassium and ammonium. Suitable thiosulfate compounds are selected from the group consisting of lithium thiosulfate, sodium thiosulfate, potassium thiosulfate and ammonium thiosulfate. Thiosulfates are the preferred inorganic sulfur-containing compound. The concentration of the inorganic sulfur-containing compound ranges from 1 to 1000 mg/l, more preferably from 5 to 200 mg/l.

The aqueous autocatalytic plating bath composition according to the present invention can be used in either horizontal or vertical plating equipment.

A typical plating pretreatment is outlined below:

A substrate having metallic contact areas is first cleaned with an etch cleaner, the etch cleaner preferably comprising $H_2SO_4$. Next, the substrate is contacted with the plating bath according to the present invention either by dipping the substrate into the plating bath or by spaying the plating bath onto the substrate. Alternatively, the substrate can be exposed to an activation bath before it is contacted with the plating bath according to the invention. In the activation bath another metal is deposited on the copper, typically by an immersion step. Such a metal could be palladium, which is well known for its strong catalytic activity, or tin, which could be deposited by an immersion tin bath.

The substrate is contacted with the plating bath composition for 30 s to 7200 s, more preferably 300 s to 1800 s. The temperature or the plating bath is held during plating in a range from 40° C. to 95° C., more preferably 60° C. to 85° C.

Optionally, the tin or tin alloy deposit is post-treated with an anti-tarnish composition, the composition comprising a phosphorous-containing compound. Rinsing with water between each process step is suitable.

EXAMPLES

The invention will now be illustrated by reference to the following non-limiting examples.

Printed circuit board substrates having surface areas made of copper were micro etched with a solution comprising sulphuric acid (T=35° C., t=1 min), rinsed with water and then immersed in an autocatalytic tin plating bath (T=70° C., t=15 min, stirring), rinsed with water again and dried (T=60° C., t=15 min). The thickness of the deposited tin layer was determined by X-ray fluorescence (XRF) measurements. The plating rate was calculated by dividing the tin layer thickness by the plating time. A plating rate of at least 0.5 μm/15 min is required for practical applications.

The plating bath stability was further rated by stability numbers in five classes wherein 5 resembles to a very stable tin plating bath, i.e., no undesired precipitation of plating bath ingredients or metallic tin occurs during use of the plating bath, and 1 resembles to an unstable plating bath wherein an undesired precipitation of metallic tin occurs before or during heating up the plating bath to the desired plating bath temperature of 60° C.

Example 1

Comparative

An autocatalytic tin plating bath containing 7.6 g/l $SnCl_2$, 51 ml of an aqueous $TiCl_3$ solution (15 wt.-% $TiCl_3$, 10 wt.-% HCl), 184.8 g/l potassium pyrophosphate, 38.8 g/l potassium citrate and 100 mg/l sodium thiosulfate was used. No stabilizing additive was added.

The plating bath has a stability number of 1. Therefore, plating of tin from this plating bath composition was not possible.

Example 2

5 mg/l of a HCl adduct of a compound according to formula (1) with R1 and R8=methyl, R2, R3, R4, R5, R6 and R7=H were added to the plating bath composition according to Example 1.

The plating bath has a stability number of 5. The tin plating rate was 2.1 μm/15 min.

Example 3

Comparative

An autocatalytic tin plating bath containing 15 g/l $SnCl_2$, 90 ml of an aqueous $TiCl_3$ solution (15 wt.-% $TiCl_3$, 10 wt.-% HCl), 58.4 g/l potassium pyrophosphate, 61.3 g/l potassium citrate, 70 g/l of EDTA and 100 mg/l sodium thiosulfate was used. The pH value was adjusted to 9.9 using ethylene diamine. No stabilizing additive was added.

The plating bath has a stability number of 1. Therefore, plating of tin from this plating bath composition was not possible.

Example 4

10 mg/l of a HCl adduct of a compound according to formula (1) with R1 and R8=methyl, R2, R3, R4, R5, R6 and R7=H were added to the plating bath composition according to Example 3.

The plating bath has a stability number of 4. The tin plating rate was 1.2 μm/15 min.

Example 5

15 mg/l of a compound according to formula (1) with R3 and R6=phenyl sulfonate, R1, R2, R4, R5, R7 and R8=H and Na as counter ion were added to the plating bath composition according to Example 3.

The plating bath has a stability number of 4. The tin plating rate was 1.0 μm/15 min.

Example 6

25 mg/l of a compound according to formula (1) with R1 and R8=methyl and R3 and R6=phenyl sulfonate, R2, R4, R5 and R7=H and Na as counter ion were added to the plating bath composition according to Example 3.

The plating bath has a stability number of 5. The tin plating rate was 1.1 μm/15 min.

The invention claimed is:

1. An aqueous autocatalytic tin plating bath composition comprising a water-soluble source of $Sn^{2+}$ ions, a water-soluble source of $Ti^{3+}$ ions, at least one organic complexing agent and a stabilizing additive selected from the group consisting of compounds according to formula (1), formula (2) and mixtures thereof

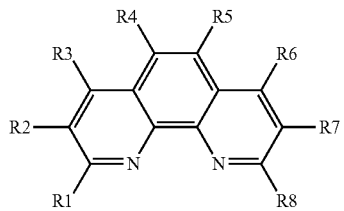

formula (1)

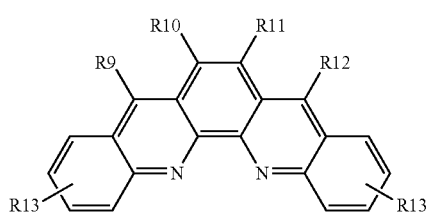

formula (2)

wherein R1, R2, R3, R4, R5, R6, R7 and R8 according to formula (1) and R9, R10, R11 and R12 according to formula (2) are independently selected from the group consisting of hydrogen, halogen, nitro, methyl, ethyl, 1-propyl, 2-propyl, phenyl, hydroxyl, sulfonate, phenyl sulfonate, amino, amido, and carboxylate, and R13 is selected from the group consisting of hydrogen and sulfonate.

2. An aqueous autocatalytic tin plating bath composition according to claim 1, wherein the pairs of residues R1 and R8; R2 and R7; R3 and R6; R4 and R5 of compounds according to formula (1) are independently selected from the same moiety of the group consisting of hydrogen, halogen, nitro, methyl, ethyl, 1-propyl, 2-propyl, phenyl, hydroxyl, sulfonate, phenyl sulfonate, amino, amido and carboxylate.

3. An aqueous autocatalytic tin plating bath composition according to claim 1, wherein the concentration of the stabilizer additive according to formula (1), formula (2) and mixtures thereof ranges from 0.1 mg/l to 200 mg/l.

4. An aqueous autocatalytic tin plating bath composition according to claim 1, wherein the concentration of $Sn^{2+}$ ions ranges from 2 g/l to 30 g/l.

5. An aqueous autocatalytic tin plating bath composition according to claim 1, wherein the concentration of $Ti^{3+}$ ions in the autocatalytic plating bath ranges from 0.5 g/l to 20 g/l.

6. An aqueous autocatalytic tin plating bath composition according to claim 1, wherein the at least one organic complexing agent is selected from the group consisting of aminocarboxylic acids, hydroxyl carboxylic acids and polycarboxylic acids.

7. An aqueous autocatalytic tin plating bath composition according to claim 1, wherein the concentration of the at least one organic complexing agent ranges from 2 g/l to 60 g/l.

8. An aqueous autocatalytic tin plating bath composition according to claim 1 further comprising a source of inorganic pentavalent phosphorous ions.

9. An aqueous autocatalytic tin plating bath composition according to claim 8, wherein the source of inorganic pentavalent phosphorous ions is selected from the group consisting of acids and salts of phosphate, hydrogenphosphate, dihydrogenphosphate and pyrophosphate.

10. An aqueous autocatalytic tin plating bath composition according to claim 8, wherein the concentration of inorganic pentavalent phosphorous ions ranges from 20 g/l to 500 g/l.

11. An aqueous autocatalytic tin plating bath composition according to claim 1, further comprising an inorganic sulfur-containing compound selected from the group consisting of sulfides, disulfides, polysulfides and thiosulfates.

12. A process for deposition of tin and tin alloys onto a substrate, the process comprising the steps of
   (i) providing a substrate having metallic contact areas and
   (ii) contacting the substrate with an aqueous autocatalytic plating bath composition according to claim 1.

13. A process for deposition of tin and tin alloys onto a substrate, the process comprising the steps of
   (i) providing a substrate having metallic contact areas,
   (ii) contacting the substrate with a micro etch composition and thereafter
   (iii) contacting the substrate with an aqueous autocatalytic plating bath composition according to claim 1.

\* \* \* \* \*